R. Daniels,
Water Wheel,
N° 11,888.
Patented Nov. 7, 1854.

United States Patent Office.

REUBEN DANIELS, OF WOODSTOCK, VERMONT.

IMPROVED JOINT IN WATER-WHEELS.

Specification forming part of Letters Patent No. 11,888, dated November 7, 1854.

*To all whom it may concern:*

Be it known that I, REUBEN DANIELS, of Woodstock, in the county of Windsor and State of Vermont, have invented certain new new and useful Improvements in Water-Wheels, of which the following is a full, clear, and exact description, reference being had to the annexed drawings, which make part of this specification, and in which—

Figure 3:
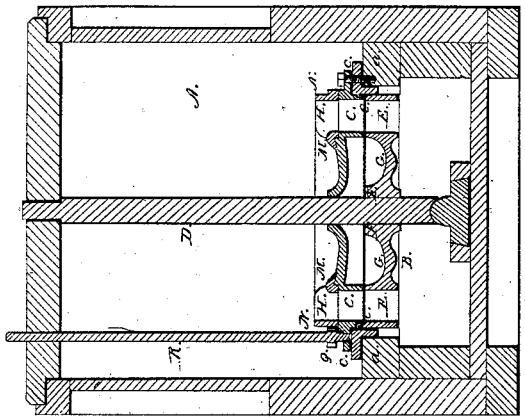
Figure 1:
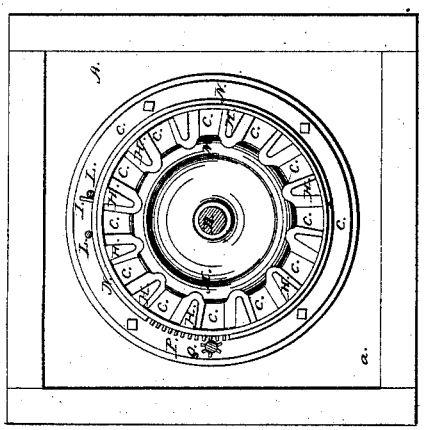
Figure 2:
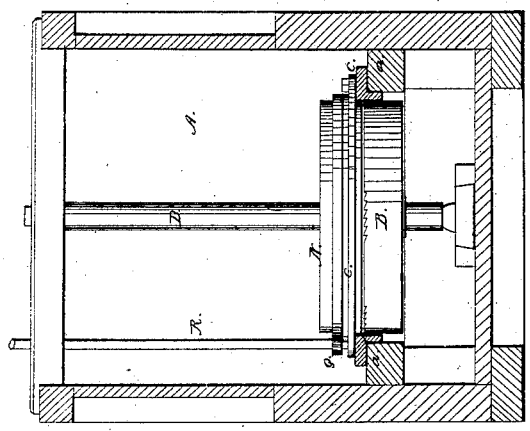

Figure 1 is a top view of the wheel and penstock; Fig. 2, a side elevation of the wheel and a portion of the penstock; and Fig. 3, a vertical section of the wheel, chute, valves, and penstock.

In the accompanying drawings, A represents the penstock, in the floor $a$ of which the wheel B and chutes C, which direct the water upon it, are fixed. The wheel is mounted upon a vertical shaft D, and is furnished with an annular series of buckets E, substantially as represented in the drawings, the curvature of the buckets in all cases being shaped to suit the head and quantity of water, duty which the wheel is required to perform, and speed at which it is required to work. The buckets are supported by and connected with the hub F by a disk G, and the hub is keyed fast to the shaft D. The water is directed into the buckets of the wheel by a corresponding series of openings in a stationary chute C. The buckets of the chute are, however, inclined in the contrary direction to that of the buckets of the wheel. The rim of the chute has a projecting flange $c$, by which it is bolted to the floor of the penstock to support it as nearly in contact with the wheel as possible without resting thereon. The buckets of the chute must, like those of the wheel, be curved as much as in the judgment of the constructer is most suitable for the particular circumstances of each case in which it is to be used.

The joint between the outer rim of the wheel and that of the chute is of a peculiar form, the upper edge of the rim of the wheel being rabbeted on the inside and the under edge of the rim of the chute being rabbeted on the outside, so as to match together and form a joint nearly close on the inside, which gradually opens toward the outside, in consequence of the manner in which the planes of the rabbets are inclined to each other, as represented in the drawings, so that any chip, straw, root, or other obstruction that might enter would readily escape and not bind in the joint, the obstruction entering at the narrow and escaping at the wide side of the joint. In addition to this, the upper edge of the rim of the wheel is serrated at intervals, in order to saw off any obstruction—as a root, for example—that might happen to get into the joint. The spaces between each series of teeth on the rim of the wheel prevent the teeth from cutting into the adjacent rim of the chute. By this construction of the joint I am enabled to run the two rims very close together, thereby preventing leakage to an extent that will materially affect the power of the wheel without neutralizing the gain thus effected by creating increased friction, as would be the case with joints as heretofore constructed.

The quantity of water admitted to the wheel can be regulated at will by an annular series of slide-valves H, resting upon the upper side of the buckets of the chute. The number of valves in the series corresponds to the number of buckets in the chute, and each valve is of such a size that it will just cover an opening in the chute, so that by turning the valve to the right and left the apertures through the chute can be closed, left wide open, or partially open, as may be required, to allow the proper quantity of water to enter the wheel.

An arm I projects from the outside of one of the valves, which traverses the space between two pins L. These pins limit the range of motion of the valves to opening and closing the apertures in the chute.

The series of valves are each sloped on opposite sides toward adjacent orifices in the chute, so that in whatever position the valve may be adjusted to vary the quantity of water admitted into the chute the direction which the sloped sides of the valves gives to the effluent water will remain substantially unchanged. These valves are connected by an inner rim M and an outer rim N, a portion of the outer rim being fitted with a series of cog-teeth P, into which a pinion Q on a spindle R is geared. This spindle extends above the surface of the water in the penstock, so that it may be turned by hand or connected with a governor driven by the wheel and turned by that, so as to increase or lessen the discharge of water, as required, to maintain the wheel at a speed as nearly equable as possible.

What I claim as my invention, and desire to secure by Letters Patent, is—

The peculiar construction of the joint between the rims of the chute and wheel, as herein described.

In testimony whereof I have hereunto subscribed my name.

REUBEN DANIELS.

Witnesses:
P. H. WATSON,
PETER HANNAY.